Figure 1:
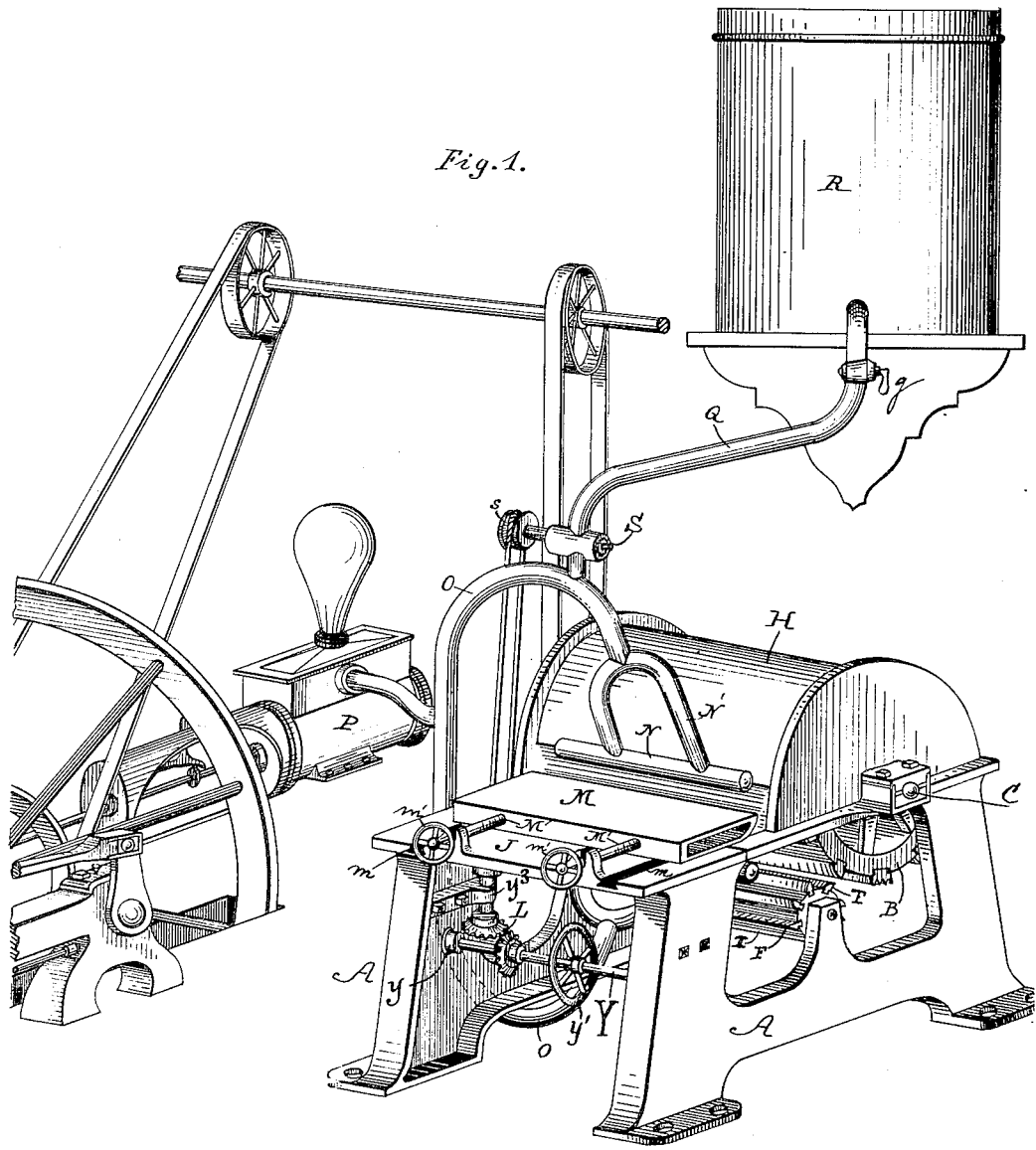

(No Model.)  2 Sheets—Sheet 1.

R. R. ROBERTS.
FIBRATING MACHINE.

No. 418,899. Patented Jan. 7, 1890.

Witnesses
Thos. Houghton.
Jam'l H. Jacobson

Inventor
Robert R. Roberts
By his Attorneys
Abraham and Mayer (No Model.) 2 Sheets—Sheet 2.

R. R. ROBERTS.
FIBRATING MACHINE.

No. 418,899. Patented Jan. 7, 1890.

Witnesses
Thos Houghton.
Saml. H. Jacobson

Inventor
Robert R. Roberts
By his Attorneys
Abraham and Mayer

UNITED STATES PATENT OFFICE.

ROBERT R. ROBERTS, OF WASHINGTON, DISTRICT OF COLUMBIA, ASSIGNOR TO RUDOLF GOLDSCHMID, TRUSTEE, OF SAME PLACE.

FIBRATING-MACHINE.

SPECIFICATION forming part of Letters Patent No. 418,899, dated January 7, 1890.

Application filed October 18, 1887. Serial No. 252,725. (No model.)

*To all whom it may concern:*

Be it known that I, ROBERT R. ROBERTS, a citizen of the United States, residing at Washington, in the District of Columbia, have invented a new and useful Improvement in Fibrating-Machines, of which the following is a specification.

My invention relates to the treatment of fibrous plants; and it consists in means whereby all classes of fibrous plants and vegetables may be filamented, thoroughly washed, cleansed, and bleached by successive steps that will remove all gummy, pulpy, and coloring matter, leaving the fibrous portions separated into filaments entirely free from all other substances, all as hereinafter more particularly described, illustrated in the drawings, and specifically pointed out in the claims.

Figure 3:
Figure 4:
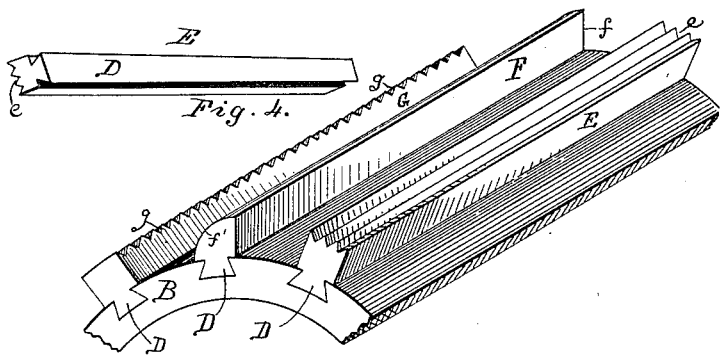
Figure 2:
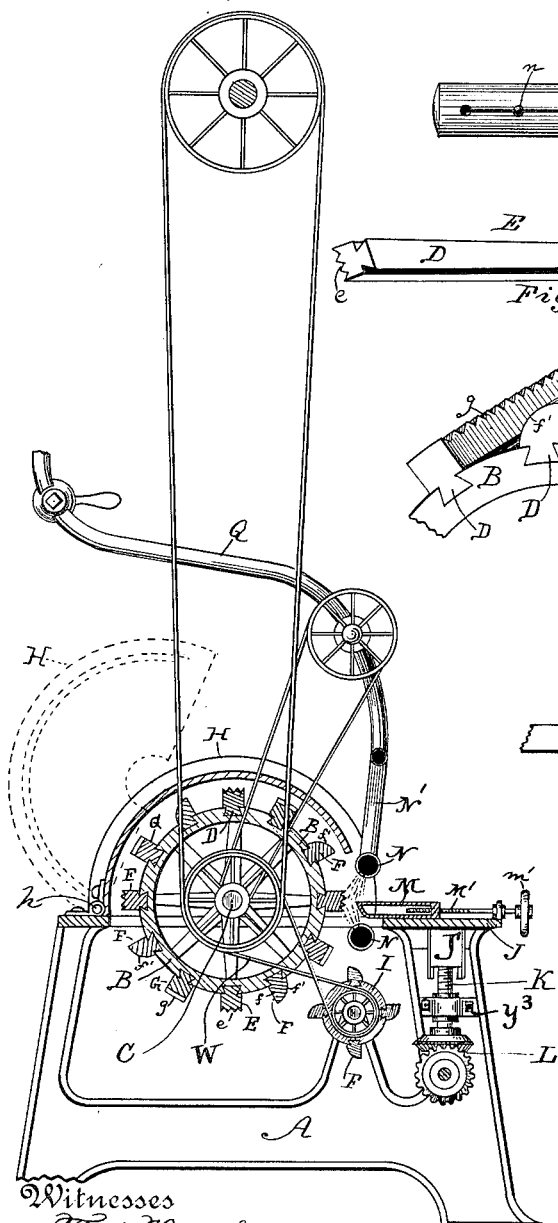
Figure 5:
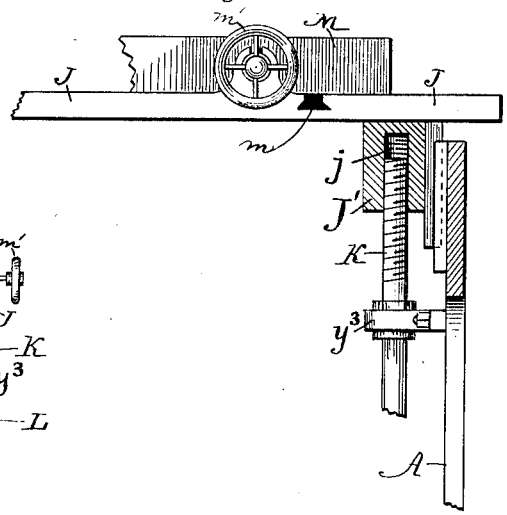

Referring to the accompanying drawings, in which like letters of reference point out similar parts on each figure, Figure 1 represents in perspective a machine embodying my invention, showing part of the gear and driving mechanism. Fig. 2 is an end view of the machine, partly in section. Fig. 3 is a detached view of a portion of the water-discharging pipe. Fig. 4 represents, on an enlarged scale, a segment of the main drum, showing a group of operating-bars extending radially therefrom, and also one of the bars detached. Fig. 5 is a detail view of a portion of the front of the machine, parts being broken away, showing means for moving the feed-table vertically and horizontally.

In the drawings, A is the frame, preferably of metal, which supports the working part of the machine.

B is a drum or cylinder mounted upon a shaft C, journaled in bearings at opposite sides of the frame and connected by belting or any suitable means to driving-gear by which a rotary motion is imparted to said drum. The periphery of the drum is formed with a series of equidistant longitudinal dovetail grooves for the reception of the dovetail shanks D of the scutching, disintegrating, and scraping bars E F G.

The bar or section E, which I call a "scutcher," has on its face a series of longitudinal angular edges $e$, formed by a series of parallel V-shaped grooves cut into the face of the scutcher.

The bar or section F has one side $f$ straight and flat its full length. From the upper edge of this flat side said bar is curved toward its shank, thus forming a continuous rounded side $f'$. This bar I denominate a "beater." Its function is to beat and soften the pulp of the plant without breaking any of its fibers, so that the pulp, sap, gum, pigment, and all other matter contained in the plant shall be released from the fibrous portions thereof, and as released shall be washed away by streams and jets of water impinging thereon, as more particularly presently set forth.

G is a bar, which I call a "scraper." It has extending over the full length of its face a series of transverse V-shaped channels, thereby leaving rows of obliquely-faced $\wedge$-shaped blades or teeth $g$, (see Fig. 4,) the function of which being to strip the plant and separate the fibers in direction of their length.

Over the drum, and suitably secured to the frame, is a semi-cylindrical hood or casing H, which, when the machine is operated, prevents the water or any of the material from being thrown outwardly by centrifugal action. Said hood is hinged at $h$, whereby it can be lifted up, (see dotted lines, Fig. 2,) for an obvious purpose.

Under the drum B, parallel thereto and some distance forward thereof, is another drum I, of smaller diameter, journaled at opposite ends of the frame, and operated to rotate in an opposite direction to the drum B through a cross-bolt W, as illustrated in Fig. 2.

The drum I has radially extending from its periphery a series of beaters F.

At the front of the machine just below the horizontal diametrical plane of the drum B is a bed J, constituting part of the feed mechanism. Said bed is adjustably mounted upon the frame, so as to be raised or lowered vertically by means of screws $k$ and miter-gearing L. The preferred mechanism for raising and lowering said bed is illustrated in Figs. 1, 2, and 5. Below said bed and loosely journaled in sockets $y$, attached to the inner faces of the standards A, is a transverse shaft Y, supplied with a hand-wheel $y'$. Firmly mounted upon said shaft near each end, so as to turn therewith, is a wheel having peripheral bevel-faced teeth that mesh with a similar wheel at the lower end of the vertical shaft K, the two bevel-faced wheels composing miter-gearing L. Said vertical shaft is screw-threaded at the upper portion of its length, the lower under portion being journaled to turn in a strap $y^3$, bolted to the inner surface of the standard A. (See Figs. 1 and 5.) The under surface of the bed J at the place where each shaft K is adjusted, as above described, has a block $J'$, provided with a screw-threaded bore $j$, into which and meshing therewith takes the upper end of the shaft K. It will be readily understood that the bed J can be raised or lowered by turning the hand-wheel $y'$. Said bed carries an adjustable sliding feed-table M, movable horizontally within ways $m$ by means of screws $M'$, operated by hand-wheels $m'$. By this means the material is presented in proper position to be acted upon by the drums B and I. Above and below the bed and table, near the rear edges thereof, are located horizontal tubes or pipes N, which are connected with any suitable water-supply by means of branch pipes $N'$ and the pipes O, which latter should be provided with suitable valves to cut off the flow when drawn from a main. I prefer, however, that said pipes O should be connected to a force-pump P, arranged to be operated by the same power that communicates motion to the drums.

The pipes N are provided with a series of small openings $n$, which are connected by narrow slots $n'$, so as to discharge water in a series of small jets and in connected thin sheets upon the material from above and below while under treatment.

The water should be charged with suitable bleaching compound, and for this purpose the upper part of the conduit-pipe O has led into it a branch pipe Q, extending from a tank R. Said tank is supplied with bleaching compound in solution, that, when the valve $q$ is opened, will be free to flow therefrom through the upper branch pipe $N'$, to be discharged downwardly through the upper pipe N. At the lower part of pipe Q is a valve S, which is operated by a small pulley $s$, connected to the general gear of the machine. The object of said valve is to provide means for controlling the flow through the pipe Q. As the pulley $s$ revolves, the conduit will be alternately closed and opened. When, however, it is desired that an uninterrupted stream shall pass down to and within the pipe O, the port-holes of the valves are brought into alignment with the pipe, the belt of the pulley $s$ is unshipped, and the liquid will be free to flow continuously from the pipe Q into the pipe O, and from thence will be led into the pipes $N N'$ to be intermingled with the water therein. The object of thus controlling the outflow from the tank is as follows: Said tank is, as before set forth, charged with bleaching compound in solution. All the plants to be treated by my machine do not require a like quantity or strength of such compound. Provision is therefore made, as described, for graduating the feed thereof—viz., for allowing a continuous flow by opening the cock $q$ of the pipe Q and unshipping the belt of the pulley $s$, or for decreasing the flow from the tank R by alternately opening and closing the valve S. It is obvious that the feed from the tank R can be entirely cut off by means of the cock $q$.

In Figs. 1 and 2 I have shown gearing, driving-pulley, fly-wheel, &c., adapted to operate the several members of the machine simultaneously from one source of power; but it is obvious the same may be varied without departing from the scope of my invention. The object of forming dovetail shanks to the bars to be seated in the dovetail grooves of the drum is to keep said bars firmly in position when said drum is rapidly revolved; but I do not desire to be understood as limiting myself to this manner of connecting the bars to the drum, as it is manifest that other means may be employed for such purpose and be within the scope of my invention—as, for instance, bolts, stirrups, straps, or any mechanism employed on analogous devices. When, however, the dovetails are used, I prefer that they shall taper slightly longitudinally from end to end, so that each of the bars can be readily removed from the drum by being struck at the smaller end of the tapering dovetail member. This construction is illustrated in detail of Fig. 4.

My invention will be readily understood from the above description in connection with the drawings; but in order that all persons familiar with the art to which it is allied may practice the same I will proceed to describe its operation in detail. Motion being imparted to the machine and the water-supply being turned on, the material is fed over the table M toward the rotating drums, said table having been previously adjusted to its proper position. The end of the plant to be treated is presented to the rotating bars and is slowly fed along the table toward the revolving drums. The manner in which the plant is fed is indicated in dotted lines and arrows, Fig. 1. There is a small space intervening between the inner edge of the table M and the faces of the several bars on the drum B. As the material passes over the edge of the table it will have a tendency to fall by gravity; but the jets and sheets of water ejected upwardly from the lower pipe N will tend to support said material and continually throw it upwardly, said water forming a yielding surface. When a sufficient length of the material has been fed from the table to reach the lower drum I, it will loosely rest thereon and be subjected on its under surface to the action of the beaters F on said drum, while the upper surface will be acted on by the bars extending outwardly from the drum B, during all of which time the material will be gently beat to and fro continually under subjection above and below to an impinging sheet and jets of water, and be thereby thoroughly cleansed and stripped of any extraneous matter adherent thereto, and will, moreover, be impregnated with bleaching compounds, the effect of which will be to eventually bleach the filaments.

The material to be treated is subjected to the action of the rotating scutchers, beaters, and scrapers upon the drum B in the order named, and at the same time to the action of the impregnated water from above and the sheet and jets of water from below, also during progression to action of the beaters upon the drum I, whereby the plant is completely fibrated, thoroughly cleaned, scraped, and bleached.

It is evident that any number of groups of operating-bars may be adjusted upon the drum B, arranged in the order described.

I am aware that it is not new to discharge water onto plants while they are being passed through disintegrating and decorticating machines, and lay no claim, broadly, thereto.

Having thus fully described my invention and the manner of practicing the same, what I claim, and desire to secure by Letters Patent, is—

1. The drum B, provided upon its periphery and radially extending therefrom with scutchers E, having upon their face and extending the full length thereof parallel longitudinal V-shaped grooves e, beaters F, having one side flat and the opposite side f curved in cross-section, and scrapers G, provided on their faces with V-shaped transverse channels forming a series of V-shaped teeth the full length of each scraper, said scutchers, beaters, and scrapers being arranged in groups in the consecutive order as named, each one being of the full length of the drum, as and for the purpose intended, substantially as described.

2. The drum B, armed with a series of scutching, beating, and scraping devices extending radially therefrom, and the bed J, provided with means for vertical adjustment, said bed supplied with feed-table M, provided with means for horizontal movement upon the bed, all in combination with water-distributing pipes arranged above and below the feed-table, said pipes provided with eduction-openings, whereby, when the machine is actuated, water will be ejected upwardly and downwardly, substantially as described.

3. The combination of drum B, armed with the scutching, beating, and scraping bars, of the water-distributing pipes having a series of eduction-apertures and connecting-slots adapted to discharge water in jets and sheets, substantially as described.

4. The drum B, having upon its surface and radially extending therefrom in consecutive order scutchers E, having V-shaped longitudinal grooves e extending the full length thereof, beaters F, having one side flat and the opposite side f curved in cross-section, and scrapers G, provided with transverse V-shaped grooves the full length thereof, said scutchers, beaters, and scrapers arranged consecutively in the order named, in combination with the drum I, of smaller diameter than said drum B, armed with radially-extending beaters F, said drums by means of a crossed belt W being geared to rotate in opposite directions, as and for the purpose indicated, substantially as described.

5. The combination, in a machine for fibrating vegetable substances, of the following elements: a rotatable drum armed upon its periphery with groups of scutching, beating, and scraping bars, a rotatable drum of smaller diameter armed with radially-extending beater-bars, a feed-table provided with means, as described, for adjustment vertically and horizontally, and eduction-pipes arranged to discharge toward said feed-table from above and below, all connected to suitable gearing, whereby the drums shall be rotated and the water be distributed simultaneously, substantially as described.

ROBERT R. ROBERTS.

Witnesses:
SAML. H. JACOBSON,
ANSON S. TAYLOR.